United States Patent [19]

Leon

[11] 4,173,925
[45] Nov. 13, 1979

[54] VARIABLE TILT ROTATING POT COOKER AND MIXER

[76] Inventor: Joseph L. Leon, 154-01 Barclay Ave., Flushing, N.Y. 11355

[21] Appl. No.: 906,648

[22] Filed: May 16, 1978

Related U.S. Application Data

[63] Continuation of Ser. No. 799,442, May 23, 1977, abandoned.

[51] Int. Cl.$^2$ .......................... A47J 27/00; B01F 9/02
[52] U.S. Cl. .................................... 99/348; 219/389; 219/433; 366/220; 366/231; 366/232
[58] Field of Search ............... 366/185, 187, 220, 228, 366/230, 231, 232, 233, 347; 219/389, 415, 419, 429, 432, 433; 99/348, 326, 327, 331, 332, 334, 335

[56] References Cited

U.S. PATENT DOCUMENTS

| | | | |
|---|---|---|---|
| 3,618,587 | 11/1971 | Lee | 99/348 X |
| 3,635,147 | 1/1972 | Lee | 99/348 |
| 4,048,473 | 9/1977 | Burkhart | 99/348 X |

FOREIGN PATENT DOCUMENTS

| | | | |
|---|---|---|---|
| 1262224 | 4/1961 | France | 366/231 |
| 569365 | 5/1945 | United Kingdom | 99/348 |

*Primary Examiner*—Philip R. Coe
*Attorney, Agent, or Firm*—Kenyon & Kenyon

[57] ABSTRACT

A heated, variable tilt, rotating container or pot for making possible automatic, continuous mixing or tumbling, with or without simultaneous heating, of a plurality of foods or substances. The device consists of an outer non-rotating shell pivoting on a fixed base. Inside the shell is a pot rotated by a motor attached to the bottom of the shell. A cover is secured over the pot to prevent the contents from spilling out. The shell and its pot are tiltable as a unit to any angular position from vertical to horizontal. Compartments, dividers, ridges, projections or other shapes are inside the rotating pot or on the pot wall and/or bottom, to separate, move, mix and tumble the contents when the tilt angle of the pot is other than at the vertical position. The shell contains a suitable heating system for raising the temperature of the pot. The device is provided with an automatic temperature control, motor speed control and automatic time cycle and function indicators.

21 Claims, 24 Drawing Figures

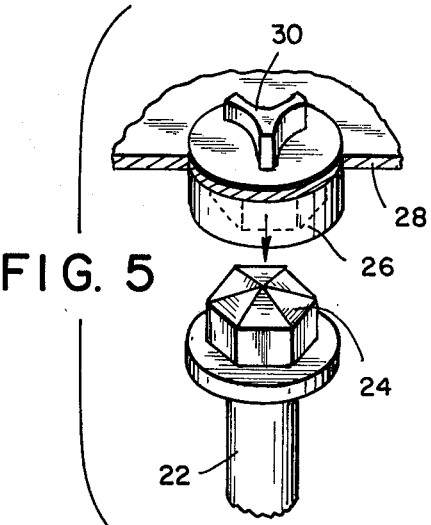
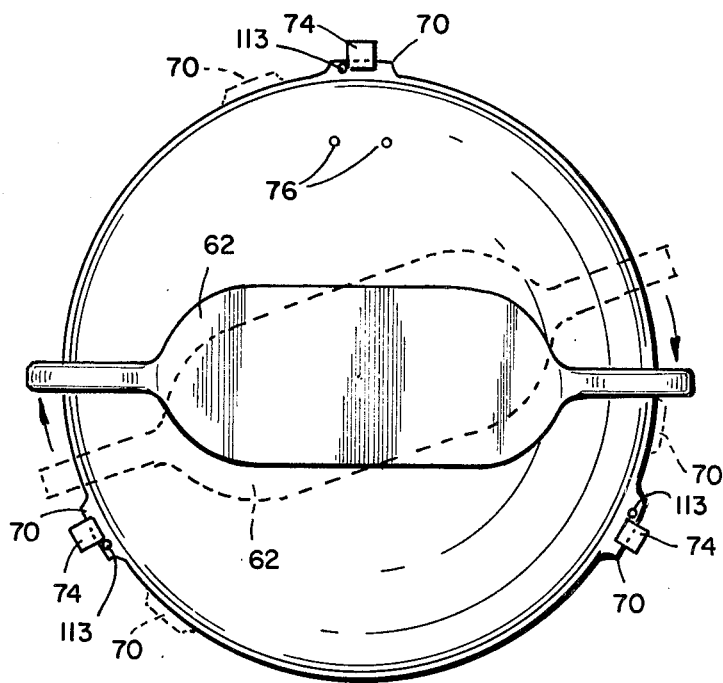
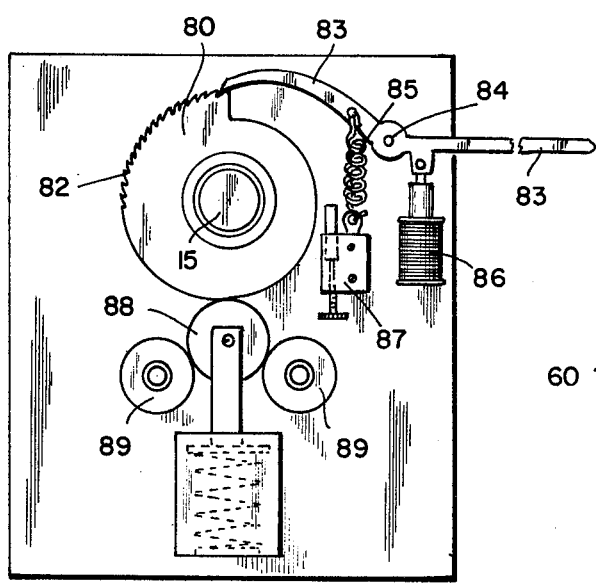
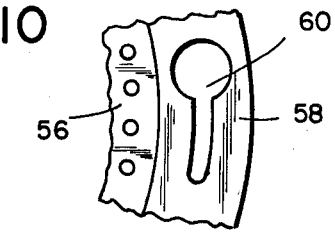
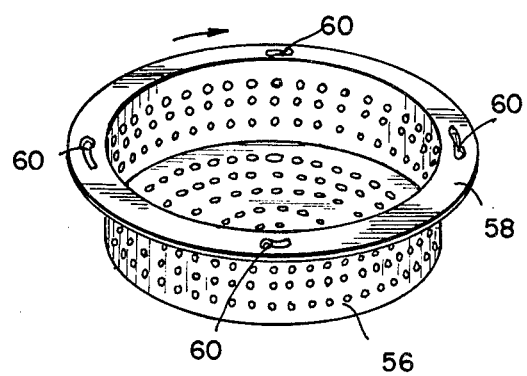

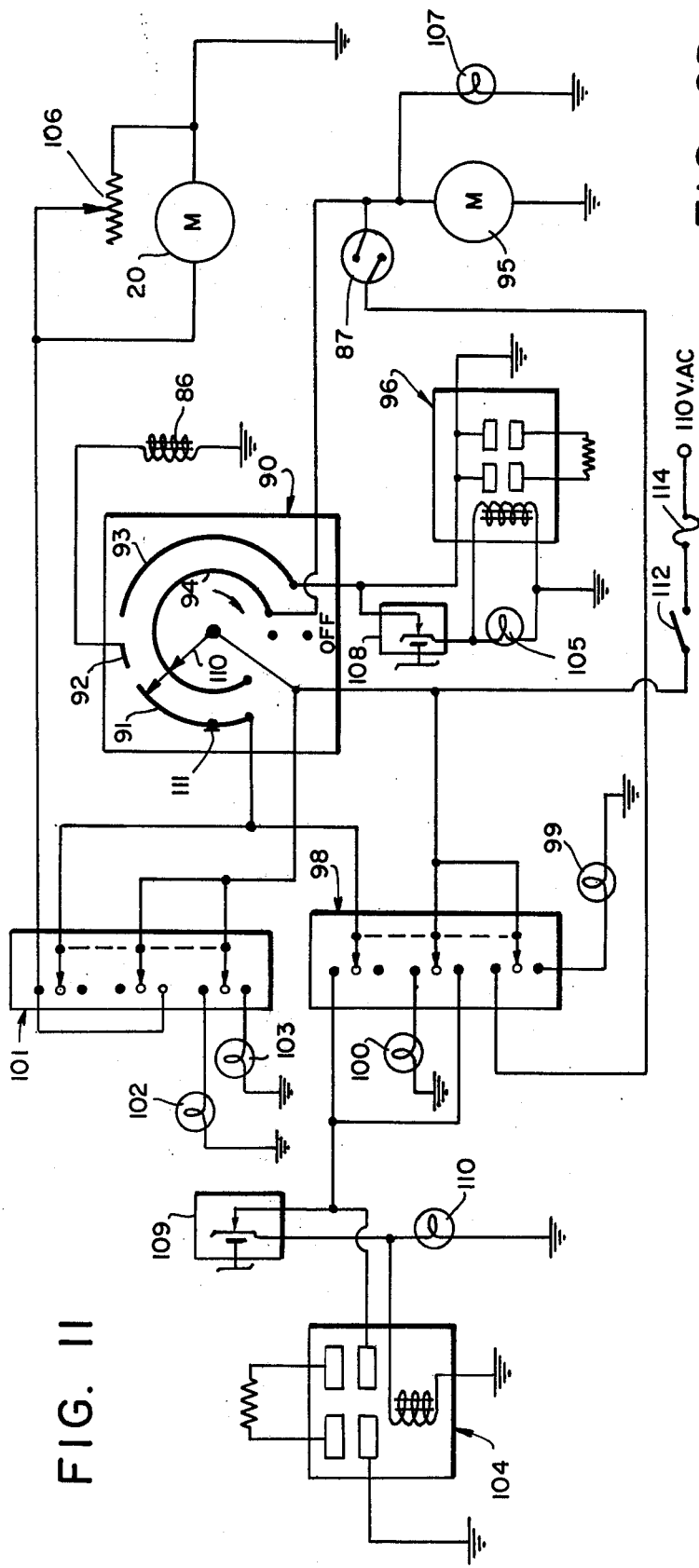
FIG. 11
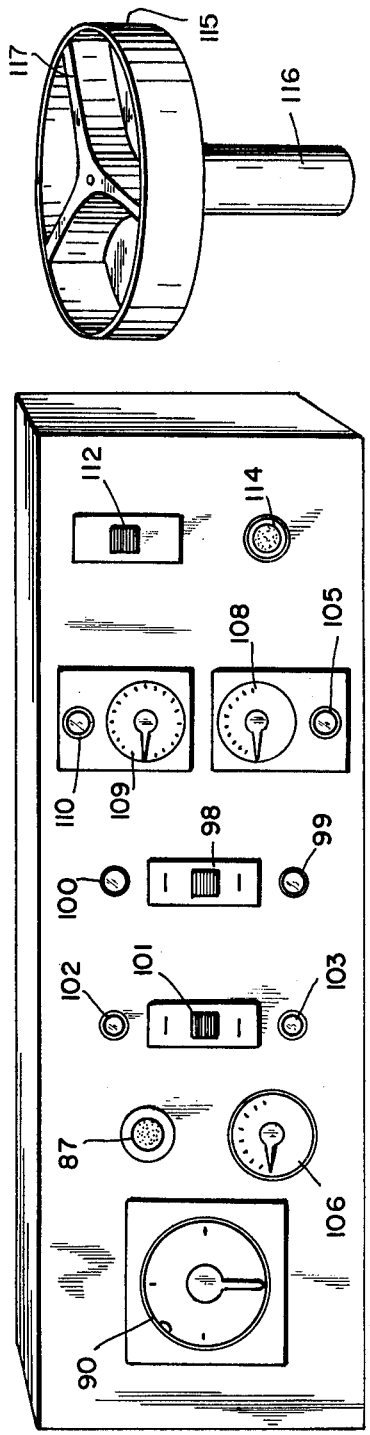
FIG. 6D
FIG. 12

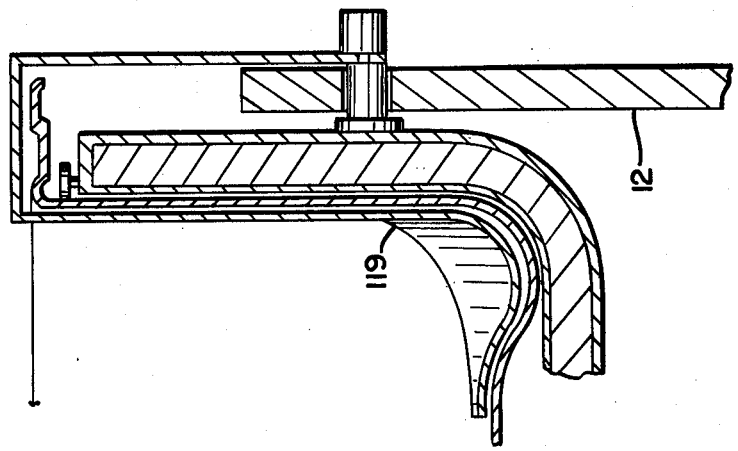
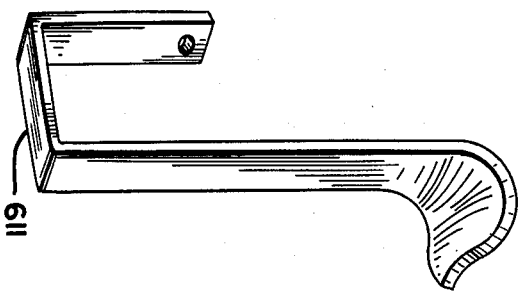
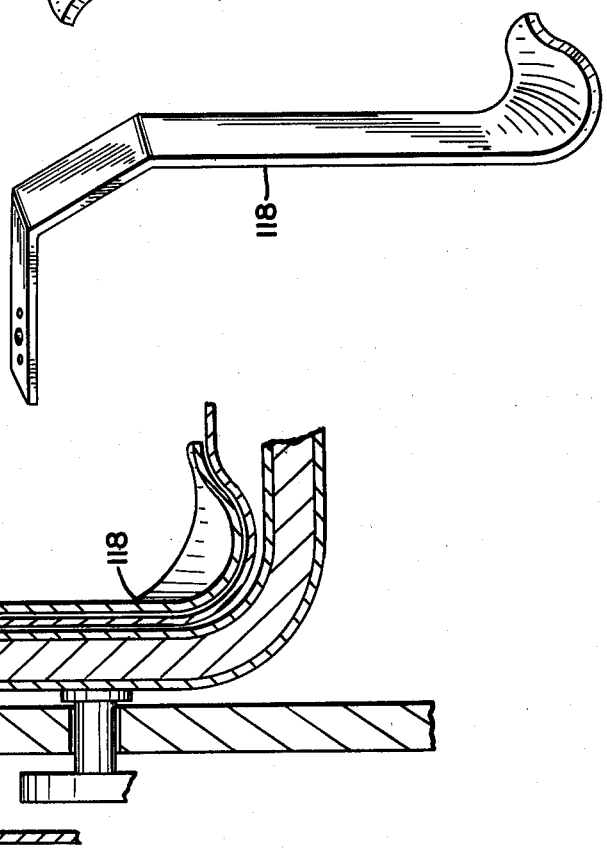
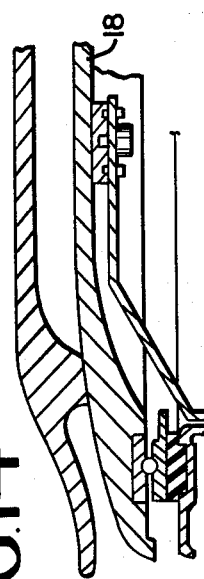

VARIABLE TILT ROTATING POT COOKER AND MIXER

This is a continuation of application Ser. No. 799,442 filed May 23, 1977, and now abandoned.

SUMMARY OF THE INVENTION

The invention relates to food processing devices or industrial and commercial mixers in general, and in particular to a rotating, heated, angular positioned pot or container, for the simultaneous mixing, tumbling, heating, cooking or processing of foods or other substances.

An object of the invention is to provide a device of the above character wherein the rotation of the pot tilted at an angle causes its contents to automatically mix or tumble without the need for the conventional stirring or agitating motions or mechanisms. The mixing action is achieved because the smooth surfaces of the rotating container are interrupted by dividers, sections, ridges or other shapes. The nearer the turning pot is to the horizontal plane, the greater the tumbling and mixing action.

Another object of the invention is to provide such a device wherein the pot's contents are automatically turned, bathed or basted in juices or liquids while repeatedly in contact with a heated surface.

A further object of the invention is to automatically prevent ingredients being heated or cooked in the presence of minimal amounts of liquids or oils from clumping together and sticking to the wall or bottom of a pot or container. The unique tumbling-mixing action of this device eliminates the need for continuous hand or mechanical agitation or stirring to prevent these occurrences.

Yet another object of the invention is to effect faster, more uniform heating or cooking of foods or other substances by continuously and automatically exposing their surfaces to heat, to liquids and oils, and to the other contents of the rotating pot.

Still another object of the invention is to prevent damage to various foods or ingredients when heated or cooked and mixed together by separation of soft and hard materials. This is achieved by multi-compartments or dividers in the pot that prevent physical contact during rotation or processing.

A further object of the invention is to permit mixing, heating or processing of foods or substances without the use of compartments or dividers in the rotating container. This is achieved by (a) altering the shape of the pot walls and/or base with depressions, ridges, or other irregularities; (b) by specially shaping the container itself, e.g., making it elliptical; (c) by using a smooth-walled container plus one or more stationary arms or shapes that come into contact with the contents of the rotating container; (d) or by employing any combination of elements a to c.

Another object of the invention is to save time and work and avoid error in the preparation of foods or other substances. Thus the unique and automatic aspects of this device will produce an entire new field of recipe development or processing.

These and other objects of the invention will become apparent from the following description in connection with the appended drawings illustrating a preferred embodiment of the invention. It is understood, however, that these are given by way of illustration and not of limitation and that changes may be made in the detail, construction, form, size and shape of the parts without affecting the scope of the invention sought to be protected.

BRIEF DESCRIPTION OF THE DRAWINGS

FIG. 5 is an exploded view detailing the detachable coupling elements of the device's driving mechanism, FIG. 6a is a bottom end view of the compartment of 6A, FIG. 6b is a bottom end view of the divider of FIG. 6B, FIG. 6c is a bottom end view of FIG. 6C.

FIG. 6D is a perspective view of a shallow container with divider,

FIG. 7 is a top plane view of the cover of the device showing the cover locking motion and result, FIG. 8 is a perspective of the screen employed in the device, FIG. 9 is a front elevation view of the tilting mechanism of the device relating cam and catch when the pot is in the horizontal position, FIG. 10 is a detail showing one of the slots empioyed in attaching the screen to the cover, FIG. 11 is a diagram of the electrical circuit, FIG. 12 shows the panel and layout of instruments and controls, FIG. 13 shows a stationary agitating arm used with the devices cover, FIG. 14 shows a portion of FIG. 1 with the arm in FIG. 13 in place and with the screen removed from the cover, FIG. 15 shows a stationary agitating arm used when the device is not covered, and FIG. 16 shows a portion of FIG. 1 with the arm in FIG. 15 in place and with the cover, screen and gasket removed.

DETAILED DESCRIPTION

Figure 1:
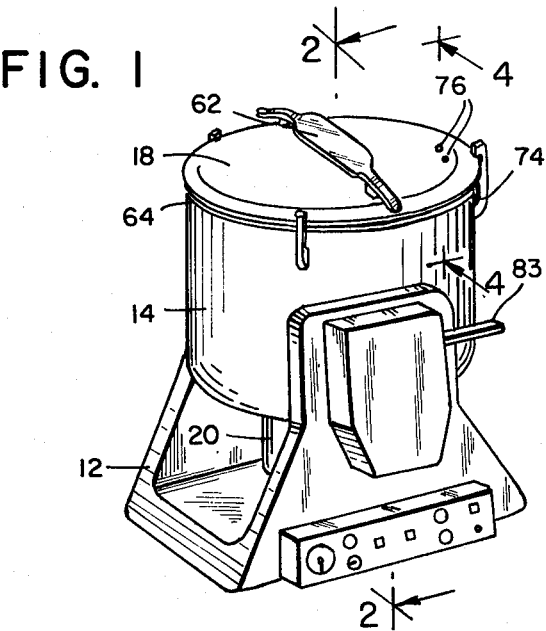
FIG. 1 is a perspective view of the exterior of the invention.

Referring to the drawings, the device according to the invention comprises a base 12, an outer double-walled insulated shell 14 tiltably mounted on the base by means of integral shafts 15 and 17 extending through bearing aperatures 19,21 in the base. A rotatable pot 16 is positioned and supported within the shell by means of roller bearings 27 and centrally secured bottom bushing 26. Bearings 27 also prevent the turning pot from rubbing against the inside of the shell. The shell is provided with a removable cover 18, to be further described in detail.

Figure 6A:
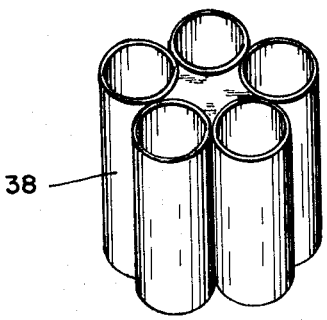
FIG. 6A is a perspective view of one of the removable food compartments employed in the device.
Figure 6B:
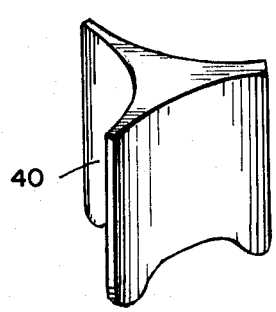
FIG. 6B is a divider.
Figure 6C:
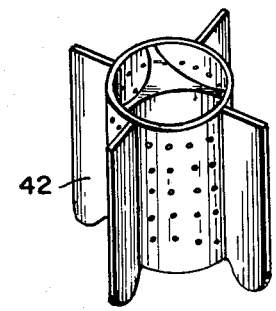
FIG. 6C is a perspective view of a removable multi-compartment divider with perforations.
Figure 6A:
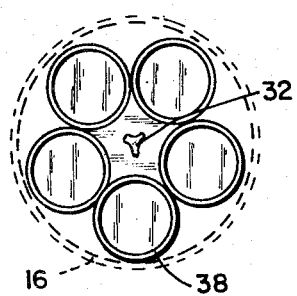
Figure 6B:
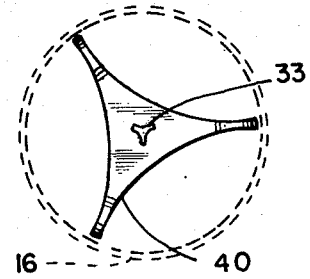
Figure 6C:
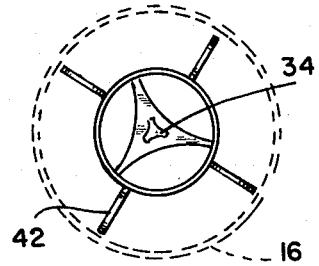

Secured centrally to the shell bottom is motor 20 having shaft 22 which ends in a hexagonal hub 24, engageable with a matching busing 26 secured to the bottom of pot 16. On top of bushing 26 is a "Y" shaped extension 30 which is engageable with similarly shaped recesses 32,33,34 of compartments and dividers 38,40,42 respectively. Pot 16 can also have dividers or compartments welded in the pot, or its surfaces formed into depressions or projections; such modified pots would not require "Y" shaped extension 30. Pot 16 when used without dividers or compartments can be fitted with arm 118 (FIG. 13) screwed to cover 18 (FIG. 14); or operated without a cover by attaching arm 119 (FIG. 15) to the side of base 12 (FIG. 16). The rotatable container can also be a shallow pan 115 (FIG. 6D) with central post 116 that locks onto extension 30. Pan 115 with divider 117 will allow processing large flat pieces of food (e.g., steak) or soft aggregates (e.g., ground meat). Pan 115 is tilted only slightly. The contents do not tumble during rotation, but fluids automatically diffuse the contents, especially if the base of pan 115 is grooved.

Cover 18 is provided with a peripheral sealed ball bearing assembly comprising circular races 46,48 and balls 50. Race 46 is cemented into the underside of cover 18. Race 48 is formed with an inwardly directed flange 52 provided with round head pins 54. A perforated screen 56 formed with a rim 58 is detachably secured to the flange 52 by engaging the slots 60 with round head pins 54. The top edge portions of compartments and dividers 38,40,42,117 are in top contacting relationship with the underside of screen 56. The materials in the compartments and between the dividers are thus prevented from falling out of the pot when it is rotating in a tilted or horizontal position. In order to conveniently secure the screen to the cover 18, the cover is inverted, placed on its flat handle 62 on a smooth surface and the screen is twisted onto the round head pins in direction of arrow in FIG. 8.

Figure 1A:
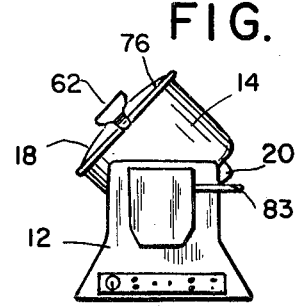
FIGS. 1A, 1B illustrates tilted positions of the device.
Figure 1B:
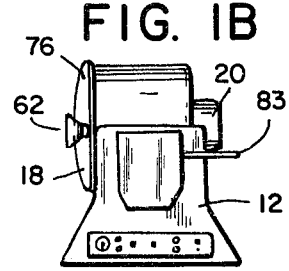
Figure 2:
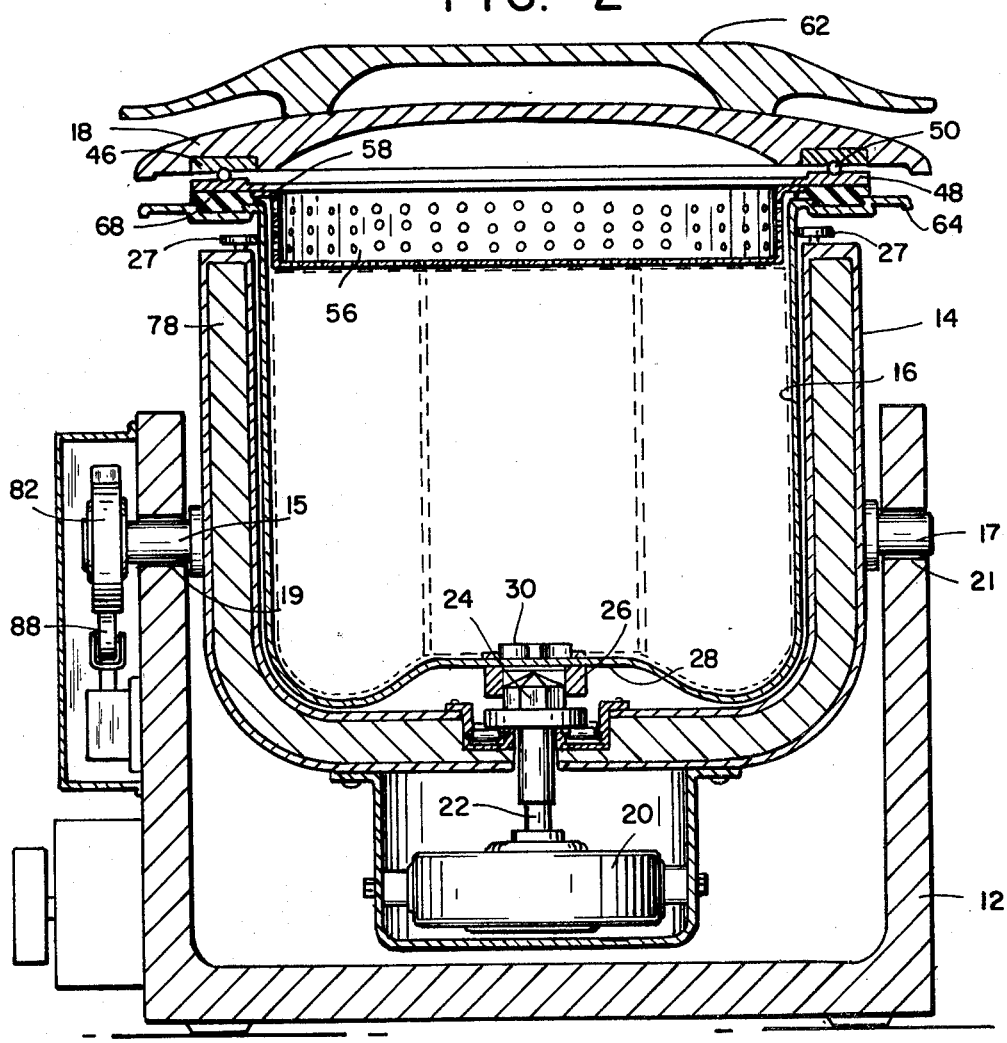
FIG. 2 is a section taken on line 2—2 of FIG. 1.
Figure 3:
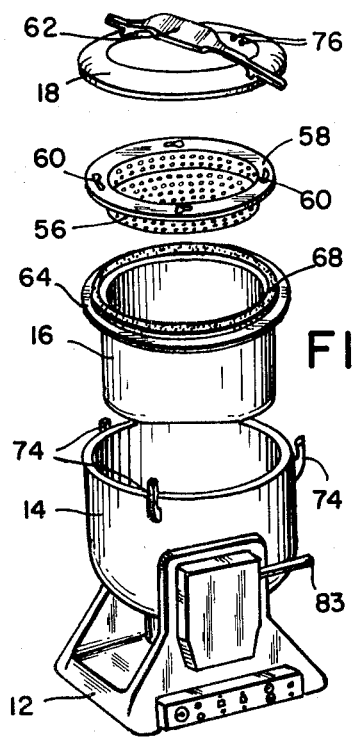
FIG. 3 is an exploded view of the components of the device.
Figure 4:
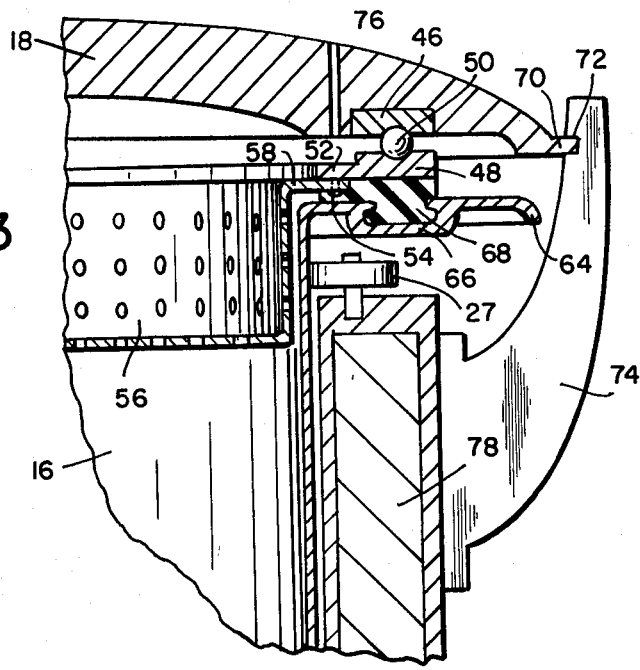
FIG. 4 is an enlarged view of a portion of FIG. 1 showing in detail the relationship bewteen the cover, the screen, the bearings, the gasket and the rotating pot.

The upper portion of pot 16 is formed with an outwardly extending flange 64 formed with a recess in which is received a circular gasket 68. Cover 18 with screen 56 attached is placed onto outer shell 14 and twisted so that its flange 70 is engaged in recesses 72 of brackets 74. The cover exerts pressure on the gasket 68, thus providing a seal for maintaining a leak-proof assembly. To relieve any apor pressure occuring during heating, the cover is provided with vents 76. These holes extend through the edge of cover 18 at a point beyond the inside diameter of pot 16. When the pot is tilted (FIG. 1A), vents 76 are always above the highest possible level of fill inside pot 16 so that the vents remain clear and open.

Vents 76 can also be one large hole fitted with an adjustable valve (to allow for varying amounts of vapor loss) or a pressure build-up valve (to allow the device to also process in a pressure-cooker mode.).

Outer shell 14 is provided with an electrical heating element 78 of known construction, for heating the contents of the pot. The heating means is given by way of example only. Other appropriate means may be employed with equal effectiveness.

The adjustable tilt and automatic return of the device is affected by cam 80 which is secured to shaft 15. The cam has a partially toothed ratchet edge portion 82, which is engaged by ratchet arm 83 pivoting at bushing 84. Spring 85 holds arm 83 against ratchet 82. A small electromagnet 86 is attached to arm 83 behind pivot point 84.

To place the device in operation, one of the desired compartments or dividers 32,33,34 is first mounted on the "Y"-shape extension 30 in pot 16. Alternatively, a specially modified pot with built-in compartments is used, or the shallow pan 115 is placed on extension 30, or if a smooth-walled pot 16 is used without dividers or compartments, arms 118 or 119 are installed as in FIGS. 14 and 16, respectively. The various ingredients about to be processed are loaded in the spaced formed by the dividers, compartments, depressions or ridges or otherwise just placed in the bottom of the pot. The high-heat time period (determined by stop 111 on arc 91 of timer 90), the temperature (determined by thermostats 108,109) and the rotational motor speed (determined by control 106) are preset for the particular procedure. Controls are shown in FIG. 12 set in a panel in the base of the device. The electrical circuit employed in the device, illustrating the operation of the controls, is shown diagramatically in FIG. 11.

Pot cover 18 is locked in place by holding the ends of the handle 62 and positioning the protruding top flanges 70 next to the three fixed lid catches 74 on the exterior wall of the double shell. The pot cover is pressed down to bias the bearing 46,48 against gasket 68 and twisted so that the flanges slip under the lid-catches 74. The cover is then turned until stops 113 bear against lid-catches 74. The cover is always positioned so that vents 76 are on the side opposite the direction of tilt.

In this locked position, cover 18 will remain stationary when the pot rotates. The lower bearing race 48 will turn by being in contact with gasket 68. Shell 14 is then pushed to the desired tilt angle as catch arm 83 slides over the teeth of cam section 82. FIG. 9 shows position of cam 80 when the pot is pushed to full horizontal position. At any desired tilt, the weight distribution of the device tries to return it to the vertical direction, but spring loaded catch arm 83 engages the teeth of the cam and holds the device in place. Screen 56 attached to the lower race 52,48 rotates with the tilted pot and prevents pieces of food or other substances from being tumbled and ground against the stationary cover 18.

At the expiration of the adjustable high-heat processing cycle of timer segment 91, the high-heat relay 104 is deenergized and motor 20 is stopped. Timer contact arm 110 moves to segment 92 energizing pull magnet 86, raising and releasing ratchet catch arm 83. This causes the device to begin to return to the initial vertical position due to its unbalanced weight distribution on axis 15,17. The timer continues is advance to segment 93 and magnet 86 is deenergized, allowing catch 83 to lower and reset. At segment 93, the low temperature keep-warm relay is activated under the control of thermostat 108. The keep-warm temperature will be maintained until the timer shuts off automatically after a maximum of seven hours. But the timer can be deactivated by flicking switch 112 at any earlier point in the timing cycle.

When the device is swinging back to the vertical position, there is provided a slow-down brake mechanism comprising a spring-loaded center roller 88 contacting the smooth peripheral edge portion of cam 80. A pair of idler rollers 89 are in engagement with the center roller on either side thereof. Due to its shape, the cam produces more pressure against the idler rollers near vertical to stop the motion of the device without bounce. When the device has returned to its initial vertical position, the cam no longer contacts the rollers. The flat end of cam 80 comes to rest against adjustable stop 87.

It is desirable to automatically return the device to the upright position after the high-heat processing-tumbling cycle to insure that all contents of the pot come into mutual contact and are also diffused with any fluids, oils, gravy, etc. This can best be achieved when everything in the pot tends to settle to the bottom of the container.

At shallow angles of tile, where the overflowing of contents will not occur, the cover 18 is optional. Any cover can be used that matches the diameter of the pot gasket 68. This smaller cover will rotate with the pot.

It will be noted that the pot bottom is formed with a concave shape to recess shaft connecting bearing 26. This allows pot 16 to be placed on a flat surface and also prevents marring the surface.

As will be further noted in FIG. 11, the high-heat relay 104 and the rotating pot motor 20 can be cycled automatically by timer 90. But the heat and rotation can also be independently operated without any timing limitation with the appropriate setting of ganged switches 98 and 101 respectively; up for automatic, down for non-timer operation (and center for off). Pilot lights 102,103,100 and 99 give visual indication of switch settings. Thus switches 98 and 101 permit non-timed preheating of the pot before loading and extra heating or mixing after a cycle. Automatic operation can be instituted by moving switches 98,101 to the up position and depressing pushbutton 87. Button 87 is a momentary contact switch held down just long enough to energize timer motor 95. Timer arm 110 then swings to the maximum counter-clockwise position permitted by the setting of stop 111 on segment 91. Arm 110 then begins its timed return in a clock-wise direction. Timer 95 has two separate timing tracks contacted by arm 110. The inner segment 94 maintains current to the motor 95 during the cycle after button 87 is released. At the end of the cycle, or any time current is interrupted to motor 95, arm 110 is pulled to the off position by spring action.

What is claimed is:

1. A variable tilt, rotating pot for cooking and mixing a plurality of foods or substances, comprising
   a base,
   a shell pivotably mounted on said base and movable between horizontal and vertical positions,
   a pot rotatably mounted in said shell and adapted for mixing and tumbling said foods or substances,
   means, coupled to said pot and mounted on said shell, for rotating said pot in said shell,
   cover means adapted for disposal over said pot in sealing engagement therewith,
   bracket means, mounted on said shell, for securing said cover means to said pot in a fixed position relative to said pot and said shell,
   bearing means, mounted on said cover means and adapted for disposal between said cover means and said pot in engagement with said pot, for permitting rotation of said pot relative to said cover,
   means for holding said shell and said pot in a tilted position during rotation of said pot, and
   vent means, disposed in said cover means and adapted to communicate with the interior of said pot, said vent means being located vertically above a horizontal diameter of said pot adjacent a vertically uppermost edge of said cover means for permitting the release of pressure from said pot.

2. The pot recited in claim 1, wherein said holding means further comprises means for moving said shell and said pot from said tilted position to said vertical position, said moving means comprising a cam coupled to said shell having a plurality of ratchet teeth disposed on the edge thereof, a ratchet arm pivotably mounted on said base for engagement with said ratchet teeth, spring means for holding said ratchet arm in engagement with said ratchet teeth, means for disengaging said ratchet arm from said ratchet teeth, and means disposed in engagement with said cam for braking movement of said shell and said pot during return movement of said shell and said pot from said tilted position to said vertical position.

3. The pot recited in calim 2, wherein said braking means comprises spring-loaded roller means disposed in engagement with said edge of said cam, and a pair of idler rollers disposed laterally adjacent to said spring-loaded roller means, said cam being rotatable in response to pivotal movement of said shell and adapted to press said spring-loaded roller means into engagement with said idler rollers and exert increasing pressure against said idler rollers as said shell and said pot move towards said vertical position from said tilted position.

4. The pot recited in claim 3, wherein said means for holding said shell and said pot in said tilted position further comprises adjustable stop means for engaging said cam when said shell and said pot are disposed in said vertical position.

5. The pot recited in claim 1, further comprising means, disposed in said pot, for dividing said pot into a plurality of compartments for mixing and tumbling said foods or substances.

6. The pot recited in claim 5, wherein said dividing means comprises a plurality of elongated cylindrical members disposed in said pot along the inner circumference thereof, the inner spaces of said cylindrical members dividing said pot into said plurality of compartments for mixing and tumbling said foods or substances.

7. The pot recited in claim 5, wherein said dividing means comprises a generally triangular-shaped member disposed in said pot having radially-inwardly curved surfaces the ends of which extend outwardly to the inner circumference of said pot, the spaces in said pot between said curved surfaces and said inner circumference of said pot dividing said pot into said plurality of compartments for mixing and tumbling said foods or substances.

8. The pot recited in claim 5, wherein said dividing means comprises an elongated cylindrical member having a plurality of radially-outwardly extending plate members coupled thereto, the spaces in said pot between said cylindrical member and the inner circumference of said pot and between said plate members dividing said pot into said plurality of compartments for mixing and tumbling said foods or substances.

9. The pot recited in claim 8, wherein said cylindrical member comprises a perforated cylindrical member.

10. The pot recited in claim 5, further comprising a perforated screen, disposed in said pot at the open end thereof between said cover means and said dividing means, for holding solid foods or substances in said compartments of said pot when said shell and said pot are disposed in a tilted position.

11. The pot recited in claim 5, further comprising a Y-shaped extension member mounted on the inner bottom surface of said pot, said dividing means including a Y-shaped recess adapted for receiving said extension member for mounting said dividing means in said pot.

12. The pot recited in claim 11, further comprising an elongated arm member having a curved end portion extending downwardly into said pot beneath said cover means for mixing and tumbling said foods or substances during rotation of said pot.

13. The pot recited in claim 12, wherein said arm member is coupled to said cover means.

14. The pot recited in claim 1, wherein said rotating means comprises a motor mounted on the outer bottom surface of said shell having a shaft extending through the bottom of said shell and terminating in a hexagonal-shaped hub, said pot further comprising a hexagonal-shaped bushing mounted on the outer bottom surface thereof adapted for receiving said hub.

15. The pot recited in claim 1, wherein said bearing means comprises a pair of circular bearing races, one of said races being fastened to the bottom surface of said cover means.

16. The pot recited in claim 15, wherein the other of said bearing races includes a radially inwardly directed flange member, said flange member including head pin means disposed on the bottom surface of said flange member, and wherein said pot further comprises a perforated screen disposed in said pot at the open end thereof, for holding solid foods or substances in said compartments of said pot when said shell and said pot are disposed in a tilted position, said screen including a rim adapted to be disposed between said bearing means of said cover means and said pot, having a plurality of peripheral slots for receiving said head pin means and securing said screen on said flange member.

17. A variable tilt, rotating pot for cooking and mixing a plurality of foods or substances, comprising
 a base,
 a shell pivotably mounted on said base and movable between horizontal and vertical positions,
 a pot rotatably mounted in said shell,
 means, coupled to said pot and mounted on said shell, for rotating said pot in said shell,
 means for holding said shell and said pot in a tilted position during rotation of said pot, said holding means further comprising means for moving said shell and said pot from said tilted position to said vertical position, said moving means comprising a cam coupled to said shell having a plurality of ratchet teeth disposed on the edge thereof, a ratchet arm pivotably mounted on said base for engagement with said ratchet teeth, spring means for holding said ratchet arm in engagement with said ratchet teeth, means for disengaging said ratchet arm from said ratchet teeth, and means disposed in engagement with said cam for braking movement of said shell and said pot during return movement of said shell and said pot from said tilted position to said vertical position, and
 stationary elongated arm member means extending downwardly into said pot, said arm member means including a curved end portion for mixing and tumbling said foods or substances during rotation of said pot.

18. The pot recited in claim 17, wherein said braking means comprises spring-loaded roller means disposed in engagement with said edge of said cam, and a pair of idler rollers disposed laterally adjacent to said spring-loaded roller means, said cam being rotatable in response to pivotal movement of said shell and adapted to press said spring-loaded roller means into engagement with said idler rollers and exert increasing pressure against said idler rollers as said shell and said pot move toward said vertical position from said tilted position.

19. The pot recited in claim 18, wherein said means for holding said shell and said pot in said tilted position further comprises adjustable stop means for engaging said cam when said shell and said pot are disposed in said vertical position.

20. The pot recited in claim 17, wherein said rotating means comprises a motor mounted on the outer bottom surface of said shell having a shaft extending through the bottom of said shell and terminating in a hexagonal-shaped hub, said pot further comprising a hexagonal-shaped bushing mounted on the outer bottom surface thereof adapted for receiving said hub.

21. The variable kilt, rotating pot recited in claim 17, wherein said elongated arm member means is coupled to said shell.

* * * * *

UNITED STATES PATENT AND TRADEMARK OFFICE
CERTIFICATE OF CORRECTION

PATENT NO. : 4,173,925

DATED : November 13, 1979

INVENTOR(S) : Joseph L. Leon

It is certified that error appears in the above-identified patent and that said Letters Patent are hereby corrected as shown below:

Column 2, line 14, change "bewteen" to -- between --.

Column 2, line 58, change "aperatures" to -- apertures --.

Column 2, line 67, change "busing" to -- bushing --.

Column 3, line 43, change "apor" to -- vapor --.

Column 3, line 43, change "occuring" to -- occurring --.

Column 4, line 6, change "spaced" to -- spaces --.

Column 4, line 16, change "diagramatically" to -- diagrammatically --.

Column 5, line 8, change "shailow" to -- shallow --.

UNITED STATES PATENT AND TRADEMARK OFFICE
CERTIFICATE OF CORRECTION

PATENT NO. : 4,173,925

DATED : November 13, 1979

INVENTOR(S) : Joseph L. Leon

It is certified that error appears in the above-identified patent and that said Letters Patent are hereby corrected as shown below:

Column 5, line 8, change "tile" to -- tilt --.

Column 6, line 12, change "calim" to -- claim --.

Column 8, line 29, change "kilt" to -- tilt --.

Signed and Sealed this

Fourth Day of March 1980

[SEAL]

Attest:

SIDNEY A. DIAMOND

Attesting Officer  Commissioner of Patents and Trademarks